United States Patent [19]

Severson

[11] Patent Number: 4,865,267

[45] Date of Patent: Sep. 12, 1989

[54] RAM AIR FLOW SYSTEM FOR AIRCRAFT

[75] Inventor: Mark H. Severson, Rockford, Ill.

[73] Assignee: Sundstrand Corporation, Rockford, Ill.

[21] Appl. No.: 160,269

[22] Filed: Feb. 25, 1988

[51] Int. Cl.$^4$ ............................................. B64B 1/24
[52] U.S. Cl. ................................... 244/53 B; 60/270.1
[58] Field of Search .................... 244/118.5, 57, 53 B; 98/1.5; 60/270.1, 224, 244

[56] References Cited

U.S. PATENT DOCUMENTS

| | | |
|---|---|---|
| 3,097,504 | 7/1963 | Quick et al. |
| 3,176,462 | 4/1965 | Eckert ................................ 60/270.1 |
| 3,265,331 | 8/1966 | Miles. |
| 3,537,510 | 11/1970 | Brahm et al. |
| 3,630,138 | 12/1971 | Marcussen et al. |
| 3,752,422 | 8/1973 | Runnels et al. .................. 244/118.5 |
| 4,275,857 | 6/1981 | Bergsten .......................... 244/53 B |

Primary Examiner—Joseph F. Peters, Jr.
Assistant Examiner—Jesús D. Sotelo
Attorney, Agent, or Firm—Wood, Dalton, Phillips Mason & Rowe

[57] ABSTRACT

A ram air flow system for an aircraft or the like wherein a ram air duct is provided with an inlet through which air enters the duct and an outlet through which air leaves the duct. A fan is located in the duct between the inlet and the outlet and is located to define a bypass portion of the duct through which air can pass through the duct past the fan. Doors are mounted in the duct for movement between a first position covering the fan to allow air to bypass the fan, and a second position exposing the fan while blocking the bypass portion of the duct to allow air to flow through the fan.

12 Claims, 2 Drawing Sheets

RAM AIR FLOW SYSTEM FOR AIRCRAFT

FIELD OF THE INVENTION

This invention generally relates to a ram air flow system for an aircraft and, particularly, to a fan augmented air flow system of this type.

BACKGROUND OF THE INVENTION

Many types of aircraft use ram air flow for various purposes such as in a cooling system for aircraft auxiliary heat loads. In other words, in aircraft cooling systems, a heat exchanger can utilize an air flow to remove heat from various heat loads such as lubricating systems, electrical systems and other heat generating sources. A readily available source of air flow is through the engine compartment or ram air flow. The air flow also might be used in the environmental system of the aircraft, such as for conditioning the air and passing the conditioned air through the pressurized cabin of the aircraft at a suitable ventilation rate. Heat exchangers often are used in the air conditioning system. In most systems of this type, the cabin air, after circulation within the cabin, simply is discharged directly overboard.

When the aircraft is in flight, the movement of the aircraft creates a sufficient source of ram air flow which can be used for purposes as described above. However, when the aircraft is on the ground or is moving at low Mach operation, a fan may have to be utilized to augment the air flow and provide a source of air to the heat exchanger systems. Most often, separate air ducts are used for the ram air flow and the forced fan air flow, or complicated partitioning means are provided within an engine compartment, for instance, to separate the two flow paths. This not only increases costs, but it is detrimental to all efforts of providing compact packaging for components in modern aircraft.

This invention is directed to an improved ram air flow system which utilizes a simple, single air duct for both types of air flow.

SUMMARY OF THE INVENTION

An object, therefore, of the invention is to provide a new and improved, simple and compact ram air flow system for aircraft or the like.

In the exemplary embodiment of the invention, a ram air duct is provided with an inlet through which air enters the duct and an outlet through which air leaves the duct. Fan means are located in the duct between the inlet and the outlet. The fan means is located to define a bypass portion of the duct through which air can pass through the duct past the fan means. Baffle means are mounted in the duct for movement between a first position covering the fan means to allow air to bypass the fan means and a second position exposing the fan means while blocking at least a portion of the bypass portion of the duct to allow air to flow through the fan means. Preferably, the baffle means, when in the position covering the fan means, is shaped for aerodynamically directing the air through the bypass portion of the duct.

As disclosed herein, the duct is generally rectangularly shaped in cross-section to define first opposing sides and second opposing sides. The fan means is located flush with the first opposing sides to define a pair of bypass portions of the duct along the second opposing sides. The baffle means include a pair of doors for conjointing covering the fan means in the first position and, alternatively, individually blocking the bypass portions of the duct in the second position. The doors, when in the first position covering the fan means, are angled to define an apex pointing toward the inlet of the duct to provide an aerodynamically efficient baffle means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
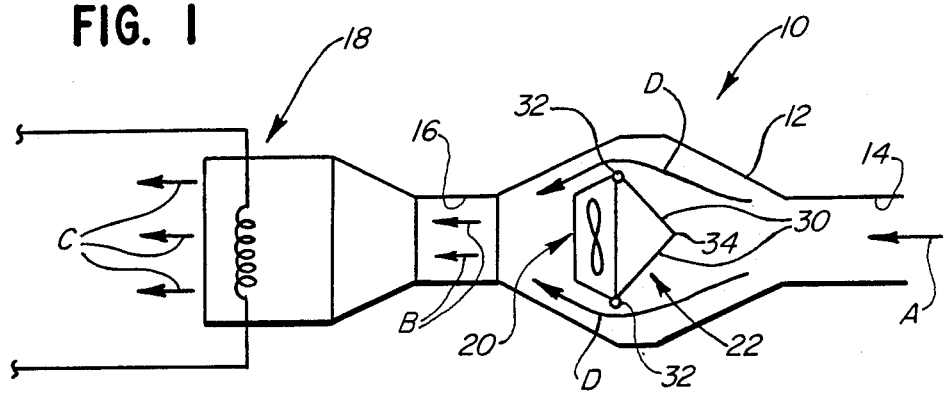
FIG. 1 is a schematic illustration of the ram air flow system of the invention, with the hinged doors forming the baffle means in closed condition covering the fan means.

Referring to the drawings in greater detail, and first to FIG. 1, a ram air flow system, generally designated 10, is shown somewhat schematically to include a ram air duct 12. The duct may be through or adjacent to the engine compartment of the aircraft and includes an inlet 14 through which air enters the duct in the direction of arrow "A". The duct also has an outlet 16 through which air leaves the duct as indicated by arrows "B". This air can be used for a variety of purposes in the aircraft operation, such as flowing to and through a heat exchanger means, generally designated 18, as indicated by arrows "C". The heat exchanger means utilizes the air flow to remove heat from various heat loads such as lubricating systems, electrical systems and other heat generating sources within the aircraft. The air also might be used with the environmental system of the aircraft to condition air, such as reducing the pressure and temperature of the air, so that it is suitable for human comfort and then passing the conditioned air through a pressurized cabin of the aircraft at an ample ventilating rate. These are examples of some of the uses of ram air flow in an aircraft.

As can be understood, when the aircraft is in flight, the movement of the aircraft creates a sufficient source of ram air flow through duct 12 which can be utilized for the purposes described above. However, when the aircraft is on the ground or during low Mach operation (less than 0.15M), means must be provided to augment the air flow system. This conventionally is done by an auxiliary fan means which most often is placed in a different air duct or in duct branches with complicated dividers, partitions or other substructures. The invention is directed to providing a ram/fan air flow system which is simple and provides a very compact packaging scheme.

More particularly, the invention contemplates mounting a fan means, generally designated 20, directly in ram air duct 12 so that the single duct can provide ram air flow as well as fan air flow. The fan means may be mounted centrally of the air duct by appropriate standoffs so as to be generally centrally located for balancing purposes. The fan, thereby, defines bypass portions, as indicated by arrows "D", within duct 12 about the fan means through which air can pass through the duct around or past the fan means.

Baffle means, generally designated 22, are provided within duct 12 for movement between a first position (FIGS. 1 and 2) covering fan means 20 to allow air to bypass the fan means as shown by arrows "D" and a second position (FIGS. 3 and 4) exposing the fan means while blocking bypass portions of the duct to allow air to flow through the fan means.

Figure 2:
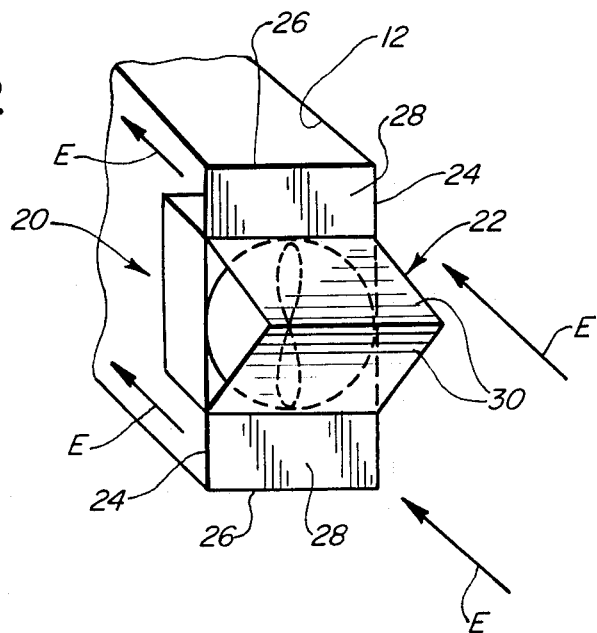
FIG. 2 is a somewhat schematic, perspective illustration of the hinged doors in closed position as shown in FIG. 1.

Specifically, as shown in FIG. 2, ram air duct 12 is generally rectangularly shaped in cross-section to define first opposing sides 24 and second opposing sides 26. Fan means 20 are located flush with sides 24 and spaced from sides 26 to define a pair of bypass portions 28 of the air duct along sides 26. Therefore, air can flow through bypass portions 28, past fan means 20, as indicated by arrows "E" (FIG. 2).

Baffle means 22 are formed by a pair of doors 30 pivotally mounted by hinges 32 (FIG. 1) so that the doors are angled to define an apex 34 pointing toward the duct inlet when the doors are in closed condition as shown in FIG. 1. In this position, the doors not only cover fan means 22 to allow air to bypass the fan means, but the angled orientation of the doors projecting upstream toward apex 34, provide for aerodynamic efficiency of the system since it is mounted directly in the ram air flow duct. The doors thereby protect the fan and prevent the fan blades from freewheeling at high Mach speed. Any appropriate motive means can be used and operatively associated with doors 30, as by providing powered hinges 32, to open and close the doors.

Of course, ram air duct 12 could be circular in shape as well as rectangular. Correspondingly, baffle means 22 could be formed by half-moon or oval shaped doors, rather than rectangular doors 30. In addition, rather than using a pair of doors, the fan means could be offset to one side of the air duct and a single door could be used.

Figure 3:
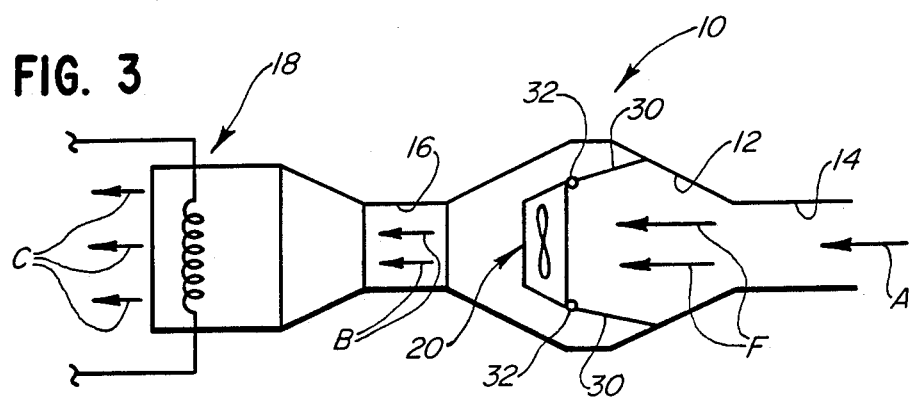
FIG. 3 is a view similar to that of FIG. 1, illustrating the hinged doors in open condition exposing the fan means and blocking the air duct bypass.
Figure 4:
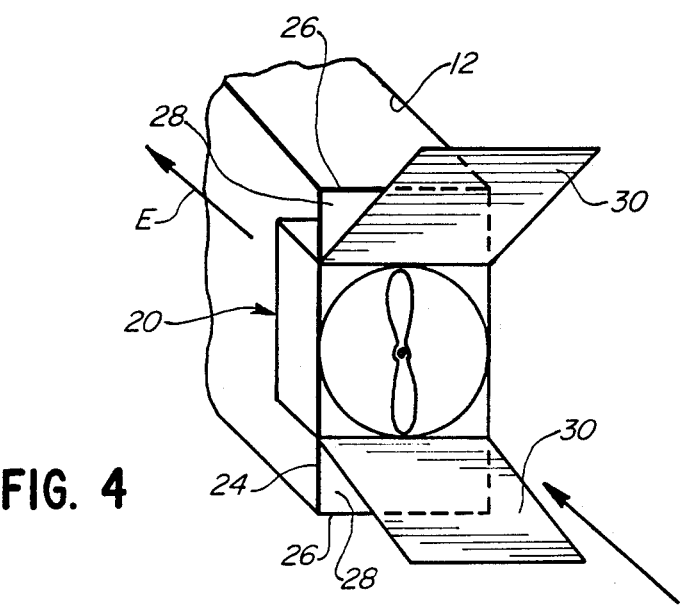
FIG. 4 is a view similar to that of FIG. 3, but with the hinged doors in open condition.

FIGS. 3 and 4 are identical to FIGS. 1 and 2, respectively, except for the positioning of doors 30, and like numerals have been applied to identify like elements described in relation to FIGS. 1 and 2.

Specifically, FIGS. 3 and 4 show doors 30 in their second or open condition so that air entering duct 12 through inlet 14 is directed straight into fan means 20, as indicated by arrows "F". Doors 30 are pivoted to limit positions where they engage sides 26 of rectangularly shaped duct 12 to block air from bypassing the fan means while exposing the fan means in order to draw air through inlet 14 and force the air out through outlet 16 and to heat exchanger 18 or other air requiring systems of the aircraft. Preferably, the doors would engage snuggly against the sides of the duct on the interior thereof to completely block any air from bypassing the fan means, for efficiency purposes.

From the foregoing, it can be seen that a very compact package is afforded for a ram air flow system for aircraft or the like wherein the fan is located directly within the ram air duct for selectively allowing air to bypass the fan, such as during flight, with the fan protected from incoming air, and for exposing the fan while blocking the remainder of the air duct to allow for forced air to augment the auxiliary systems of the aircraft, such as when the aircraft is on the ground or during low speed operation.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A ram air flow system for an aircraft, comprising:
   a ram air duct having an inlet through which air enters the duct and an outlet through which air leaves the duct;
   fan means located in the duct between the inlet and the outlet and located to define first air passage means through the fan means and second air passage means outside the fan means to define a bypass portion of the duct through which air can pass through the duct past the fan means; and
   baffle means mounted in the duct for movement between a first position covering the fan means and the first air passage means to allow air to bypass the fan means and a second position exposing the fan means while blocking at least a portion of the second air passage means and the bypass portion of the duct to allow air to flow through the fan means.

2. The ram air flow system of claim 1 wherein said fan means are located generally centrally of the duct to define bypass portions of the duct on opposite sides of the fan means.

3. The ram air flow system of claim 1 wherein said baffle means, when in said first position, are shaped for aerodynamically directing the air through said bypass portion of the duct.

4. A ram air flow system for an aircraft, comprising:
   a ram air duct generally rectangularly shaped in cross-section to define first opposing sides and second opposing sides and having an inlet through which air enters the duct and an outlet through which air leaves the duct;
   fan means located in the duct between the inlet and the outlet and located flush with the first opposing sides and defining a pair of bypass portions of the duct along the second opposing sides through which air can pass through the duct past the fan means; and
   baffle means mounted in the duct for movement between a first position covering the fan means to allow air to bypass the fan means and a second position exposing the fan means while blocking said bypass portions of the duct along the second opposing sides thereof to allow air to flow through the fan means.

5. The ram air flow system of claim 4 wherein said baffle means include a pair of doors movably mounted for conjointly covering the fan means in said first position and, alternately, individually blocking the bypass portions of the duct in said second position.

6. The ram air flow system of claim 5 wherein said doors, when in said first position, are angled to define an apex pointing toward the inlet to provide an aerodynamic baffle means.

7. A ram air flow system for an aircraft, comprising:
a ram air duct having an inlet through which air enters the duct and an outlet through which air leaves the duct;
fan means located generally centrally of the air duct between the inlet and the outlet to define bypass portions of the duct on opposite sides of the fan means through which air can pass through the duct past the fan means; and
a plurality of doors pivotally mounted within the duct for movement between a first position conjointly covering the fan means to allow air to bypass the fan means and a second position exposing the fan means while blocking the bypass portions of the duct to allow air to flow through the fan means.

8. The ram air flow system of claim 7 wherein said doors, when in said first position, are angled to define an apex pointing toward the inlet to provide an aerodynamic baffle means.

9. A ram air flow system for an aircraft, comprising:
a ram air duct having an inlet through which air enters the duct and an outlet through which air leaves the duct, said duct being generally rectangularly shaped in cross-section to define first opposing sides and second opposing sides;
fan means located in the duct between the inlet and the outlet and flush with the first opposing sides and defining a pair of bypass portions of the duct along the second opposing sides; and
a pair of doors pivotally mounted in the duct along opposite sides of the fan means for movement between a first position conjointly covering the fan means to allow air to bypass the fan means and, alternatively, a second position exposing the fan means while individually blocking the bypass portions of the duct to allow air to flow through the fan means.

10. The ram air flow system of claim 9 wherein said doors, when in said first position, are angled to define an apex pointing toward the inlet to provide an aerodynamic baffle means.

11. A ram air flow system for an aircraft, comprising:
a ram air duct having an inlet through which air enters the duct and an outlet through which air leaves the duct;
fan means located generally centrally of the duct between the inlet and the outlet and located to define bypass portions of the duct on opposite sides of the fan means through which air can pass through the duct past the fan means; and
a plurality of baffle members mounted in the duct for movement between a first position covering the fan means to allow air to bypass the ran means and a second position exposing the fan means while blocking the bypass portions of the duct to allow air to flow through the fan means.

12. A ram air flow system for an aircraft, comprising:
a ram air duct having an inlet through which air enters the duct and an outlet through which air leaves the duct;
heat exchanger means in communication with the outlet of the air duct;
fan means located in the duct between the inlet and the outlet and located to define a bypass portion of the duct through which air can pass through the duct past the fan means; and
baffle means mounted in the duct for movement between a first position covering the fan means to allow air to bypass the fan means and a second position exposing the fan means while blocking at least a portion of the bypass portion of the duct to allow air to flow through the fan means.

* * * * *